United States Patent [19]

Hagiwara et al.

[11] Patent Number: 5,109,159
[45] Date of Patent: Apr. 28, 1992

[54] X-RAY IMAGE SENSOR

[75] Inventors: Ryoji Hagiwara; Hiroyuki Suzuki, both of Tokyo, Japan

[73] Assignee: Seiko Instruments Inc., Japan

[21] Appl. No.: 510,291

[22] Filed: Apr. 16, 1990

[30] Foreign Application Priority Data

Apr. 18, 1989 [JP] Japan .................................. 1-98539

[51] Int. Cl.$^5$ .............................................. G01T 1/20
[52] U.S. Cl. .................................. 250/368; 250/483.1; 250/370.11; 250/366
[58] Field of Search ............. 250/370.11, 483.1, 486.1, 250/368, 366; 252/301.4 R

[56] References Cited

U.S. PATENT DOCUMENTS

| | | | |
|---|---|---|---|
| 4,205,234 | 5/1980 | Suzuki et al. | 250/483.1 |
| 4,694,177 | 9/1987 | Akai et al. | 250/368 |
| 4,740,975 | 4/1988 | Abrahams et al. | 372/41 |
| 4,804,514 | 2/1989 | Biako et al. | 376/154 |
| 4,822,696 | 4/1989 | Lammers et al. | 250/483.1 |
| 4,906,893 | 3/1990 | Homma et al. | 250/486.1 |
| 4,910,405 | 3/1990 | Suzuki et al. | 250/368 |
| 4,982,096 | 1/1991 | Fujii et al. | 250/367 |

FOREIGN PATENT DOCUMENTS

| | | |
|---|---|---|
| 1439096 | 10/1968 | Fed. Rep. of Germany ...... 250/213 |
| 57-50674 | 7/1982 | Japan . |
| 58-75083 | 7/1983 | Japan . |
| 59-122988 | 7/1984 | Japan . |
| 0318986 | 12/1989 | Japan .......................... 250/370.11 |

Primary Examiner—Carolyn E. Fields
Assistant Examiner—James Beyer
Attorney, Agent, or Firm—Bruce L. Adams; Van C. Wilks

[57] ABSTRACT

This invention relates to an X-ray image sensor formed by fitting and integrating a fiber plate equipped with a phosphor layer to and with a solid state imaging device, and to an X-ray image sensor which uses a material containing chromium (Cr) adapting to the spectral sensitivity characteristics of a silicon type solid state imaging device as the material of the phosphor layer.

12 Claims, 1 Drawing Sheet

X-RAY IMAGE SENSOR

BACKGROUND OF THE INVENTION

This invention relates to an X-ray image sensor used for industrial and remedial purposes.

In a conventional X-ray image sensor, a fiber optic plate is fitted onto a solid state imaging device, a phosphor layer having a sufficient thickness above 1 millimeter is disposed on the fiber optic plate to prevent the X-rays from transmitting through the fiber optic plate. A phosphor that has the center of its light emission range near 500 nm is used as the material of the phosphor layer.

As described above, the conventional X-ray image sensor comprises the combination of the phosphor having a light emission center near 500 nm with the solid state imaging device that has silicon as a principal material and has a broad spectral sensitivity characteristics with 800 nm as the center. Therefore, a loss of from 30 to 40% occurs due to deviation of the phosphors light emission range and the spectral sensitivity characteristics of the imaging device and this problem is left yet to be solved.

BRIEF SUMMARY OF THE INVENTION

To solve the problem described above, the X-ray image sensor of the present invention comprises a solid state imaging device, a fiber optic plate and a phosphor layer containing Cr, and at least one member selected from the group consisting of $Gd_3Ga_5O_{12}$ (hereinafter called "GGG"), $Gd_3Sc_2Ga_3O_{12}$ (hereinafter called "GSGG"), $Gd_3Sc_2Al_3O_{12}$ (hereinafter called "GSAG"), $Gd_3Ga_2Al_3O_{12}$ (hereinafter called "GGAG") and $La_3Lu_2Ga_3O_{12}$ (hereinafter called "LLGG") is used as the base material of the phosphor layer.

The Cr-containing phosphor layer used in the present invention has light emission near 750 nm as the center and this range is substantially in conformity with the broad spectral sensitivity characteristics of the solid state imaging device which is made of silicon as its principal material and having its center at 800 nm. A converted optical image, derived by the present invention does not undergo the loss of from 30 to 40% due to the deviation of the phosphors light emission range from the spectral sensitivity characteristics of the solid state imaging device.

Cerium oxide is preferably added to the core of the fiber optic plate in order to prevent damage by the X-rays passing through the phosphor layer.

Further, at least one metal oxide selected from the group consisting of lead oxide, barium oxide and lanthanum oxide is preferably added to the fiber optic plate in order to prevent the X-rays passing through the fiber optic plate from being incident to the solid state imaging device.

DETAILED DESCRIPTION

Hereinafter, embodiments of the present invention will be explained with reference to the drawings.

First Embodiment

Figure 1:
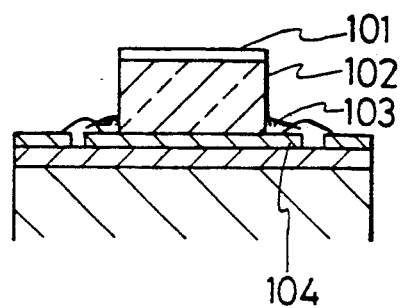
FIG. 1 is a sectional view showing an X-ray image sensor in accordance with one embodiment of the present invention.

As the first embodiment, an embodiment which uses a radiation shielding material for the fiber optic plate will be explained with reference to the drawings FIG. 1 is a sectional view showing the X-ray image sensor in accordance with the first embodiment of the present invention. Its structure is as follows. A fiber optic plate (102) is tightly bonded to an image input surface (104) of a solid state imaging device by an optical adhesive (103). Further, a phosphor layer (101) is formed on the fiber optic plate (102) to form an integrated X-ray image sensor.

In this X-ray image sensor, the following treatment is conducted for the fiber optic plate (102) and the phosphor layer (101).

In order to prevent damage due to the X-rays passing through the phosphor layer (101), 0.2 wt % of cerium oxide is added to the core of the fiber optic plate (102). Furthermore, lead oxide is added to the fiber optic plate (102) to shield the X-rays and thus to prevent the X-rays from passing through the fiber optic plate (102) from entering the solid state imaging device.

Figure 2:
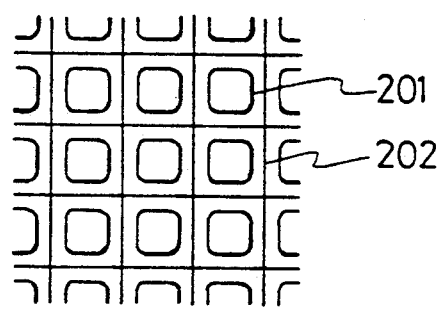
FIG. 2 is a plan view showing the surface condition of a phosphor layer in the first embodiment.
Figure 3:
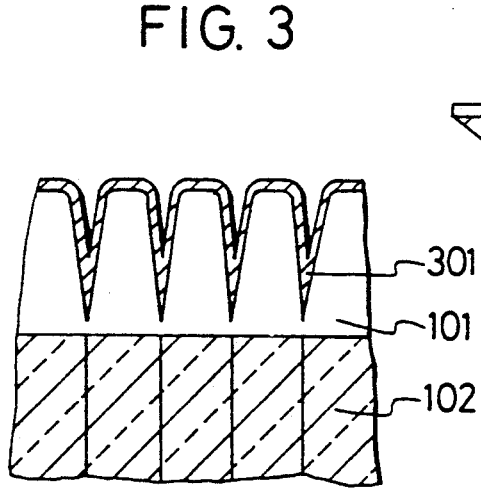
FIG. 3 is a sectional view showing the sectional condition of the phosphor layer in the first embodiment.

The phosphor layer (101) is formed in a uniform thickness of 20±3 microns by adding a binder to a powder of a GGG crystal to which 4 wt % of chromium is doped. Square portions (201) and groove portions (202) are formed in grid form on the surface of the phosphor layer (101) as shown in FIG. 2 in order to improve resolution and to suppress bleeding of the image due to expansion of emitted rays of light. Furthermore, the surface of the phosphor layer (101) is covered with a 0.01~0.1 μ-thick aluminum metal back (301) as shown in FIG. 3 so as to limit the drop of brightness due to dissipation of the emitted rays of light.

In the X-ray image sensor completed by the structure described above, sensitivity of the visible range can be improved by 30% in comparison with the X-ray image sensors that use the conventional phosphor and resolution of 25 microns can be obtained.

Second Embodiment

In the second embodiment, the X-ray image sensor is produced in the same way as in the first embodiment by adding a binder to a powder of the GSAG crystal to which 1 wt % of chromium is doped as the phosphor material and then forming a 10 μ-thick phosphor layer (101).

Here, barium oxide is added to the fiber optic plate (102) for shielding the X-rays and 0.5 wt % of cerium oxide is added to the core.

In this X-ray image sensor, sensitivity of the visible range can be improved by 20% in comparison with X-ray image sensors that use the conventional phosphor and resolution of 10 microns can be obtained.

Third Embodiment

In the third embodiment, the X-ray image sensor is produced in the same way as in the first embodiment by adding a binder to a powder of the GGAG crystal to which 0.5 wt % of chromium is doped as the phosphor material and then forming a 10 μ-thick phosphor layer (101).

Here, lanthanum oxide is added to the fiber optic plate (102) for shielding the X-rays and 0.8 wt % of cerium oxide is added to the core.

In this X-ray image sensor, sensitivity of the visible range can be improved by 15% in comparison with the X-ray image sensors that use the conventional phosphor and resolution of 10 microns can be obtained.

Fourth Embodiment

In the fourth embodiment, the X-ray image sensor is produced in the same way as in the first embodiment by adding a binder to a powder of the LLGG crystal to which 1 wt % of chromium is doped as the phosphor material and then forming a 20 μ-thick phosphor layer (101).

Here, lead oxide and barium oxide are added to the fiber optic plate (102) for shielding the X-rays and 0.4 wt % of cerium oxide is added to the core.

In this X-ray image sensor, sensitivity of the visible range can be improved by 25% in comparison with the X-ray image sensors that use the conventional phosphor and resolution of 25 microns can be obtained.

Fifth Embodiment

Figure 4:
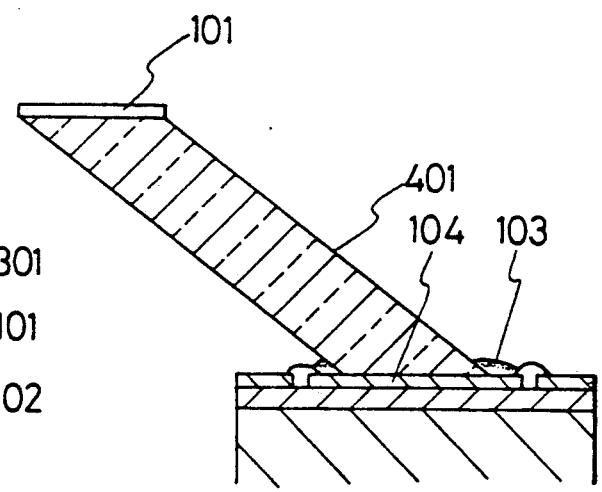
FIG. 4 is a sectional view of the X-ray image sensor in accordance with another embodiment of the present invention.

The fifth embodiment of the present invention will be described with reference to FIG. 4.

The structure is substantially the same as that of the first embodiment. However, though 0.5 wt % of cerium oxide is added to the fiber optic plate (401), the X-ray shielding material such as lead oxide is not added. Therefore, this embodiment employs the structure wherein the X-ray reception surface of the phosphor layer (101) and the visible ray reception surface of the solid state imaging device are deviated from each other, in order to prevent the transmitting X-rays from being incident to the input surface of the solid state imaging device. The material of the phosphor is the GSGG crystal to which 2 wt % of chromium is doped, a binder is added to this powder and a 30 μ-thick phosphor layer (101) is formed to produce the X-ray image sensor.

In this X-ray image sensor, sensitivity of the visible range can be improved by 27% in comparison with the X-ray image sensors that use the conventional phosphor and resolution of 30 microns can be obtained.

In accordance with the present invention, stable imaging with resolution of 10~30 microns and efficient imaging without loss can be made by use of the phosphor having a light emission range which matches the spectral sensitivity characteristics of the solid state imaging device. Furthermore, since the present invention uses cerium oxide for the fiber optic plate, it can eliminate X-ray coloration damage of the optical system and can accomplish the X-ray image sensor having much more improved life than conventional X-ray image sensors.

What is claimed is:

1. An x-ray image sensor comprising: a phosphor screen member for converting incident x-ray radiation into light radiation; a fiber optic plate having an input side disposed to receive light radiation transmitted by said phosphor screen member and an output side for exiting light radiation propagated through said fiber optic plate; and an image sensing device optically coupled to the output side of said fiber optic plate and having a range of sensitivity, wherein said phosphor screen member includes a sufficient amount of chromium to bring the center of the light emission range of said phosphor screen member near 750 nm and thus close to the center of the sensitivity range of said image sensing device.

2. An x-ray image sensor according to claim 1; wherein said phosphor screen member includes at least one member selected form the group consisting of GGG ($Gd_3Ga_5O_{12}$), GSGG ($Gd_3Sc_2Ga_3O_{12}$), GSAG ($Gd_3Sc_2Al_3O_{12}$), GGAG ($Gd_3Ga_2Al_3O_{12}$) and LLGG ($La_3Lu_2Ga_3O_{12}$).

3. An x-ray image sensor according to claim 2; wherein said fiber optic plate has a core material that includes at least one member selected from the group consisting of lead oxide, barium oxide and lanthanum oxide.

4. An x-ray image sensor according to claim 3; wherein said fiber optic plate has a core material including cerium oxide.

5. An x-ray image sensor according to claim 4; wherein said phosphor screen member has an x-ray incidence surface; and a metal film covering the surface.

6. An x-ray image sensor according to claim 5; wherein said metal film member is composed of aluminum.

7. An x-ray image sensor according to claim 6; wherein said metal film member has a thickness greater than 0.01 micron.

8. An x-ray image sensor according to claim 6; wherein said metal film member has a thickness less than 0.1 micron.

9. A x-ray image sensor according to claim 1; wherein the phosphor screen member has a surface having a grid comprised of raised portions and groove portions for improving image resolution.

10. An x-ray image sensor according to claim 1; wherein said phosphor screen member is positioned relative to said image sensing device such that an x-ray incident on said phosphor screen member is not incident on said sensing device.

11. An x-ray image sensor according to claim 1; wherein said fiber optic plate has an optical axis inclined to said phosphor screen member.

12. An x-ray image sensor according to claim 1; wherein said image sensing device has a sensitivity range centered at substantially 800 nm.

* * * * *